(12) United States Patent
Sosseh

(10) Patent No.: US 8,654,477 B2
(45) Date of Patent: Feb. 18, 2014

(54) MAXIMIZING PERFORMANCE UNDER A POWER ENVELOPE CONSTRAINT

(75) Inventor: Raye Abdoulie Sosseh, Minneapolis, MN (US)

(73) Assignee: Seagate Technology, Cupertino, CA (US)

( * ) Notice: Subject to any disclaimer, the term of this patent is extended or adjusted under 35 U.S.C. 154(b) by 313 days.

(21) Appl. No.: 12/848,374

(22) Filed: Aug. 2, 2010

(65) Prior Publication Data

US 2012/0026624 A1    Feb. 2, 2012

(51) Int. Cl.
G11B 5/596    (2006.01)
G11B 15/18    (2006.01)

(52) U.S. Cl.
USPC .......................................... 360/78.06; 360/69

(58) Field of Classification Search
None
See application file for complete search history.

(56) References Cited

U.S. PATENT DOCUMENTS

| | | | |
|---|---|---|---|
| 4,937,689 A * | 6/1990 | Seaver et al. | 360/78.07 |
| 4,991,129 A | 2/1991 | Swartz | |
| 5,452,277 A | 9/1995 | Bajorek et al. | |
| 5,978,335 A | 11/1999 | Clark et al. | |
| 6,298,016 B1 | 10/2001 | Otsuka | |
| 6,577,812 B1 | 6/2003 | Kikuchi et al. | |
| 6,781,787 B1 | 8/2004 | Codilian et al. | |
| 6,898,041 B2 * | 5/2005 | Sakamoto | 360/70 |
| 7,196,862 B1 * | 3/2007 | Adams et al. | 360/51 |
| 7,281,086 B1 * | 10/2007 | More et al. | 711/112 |
| 7,397,629 B1 * | 7/2008 | Hertzberg | 360/78.04 |
| 7,882,373 B1 * | 2/2011 | More et al. | 713/300 |
| 2003/0174433 A1 * | 9/2003 | Espeseth et al. | 360/78.07 |
| 2005/0078405 A1 * | 4/2005 | Baek et al. | 360/78.04 |
| 2007/0008866 A1 | 1/2007 | Adams et al. | |

* cited by examiner

Primary Examiner — Andrew L Sniezek
(74) Attorney, Agent, or Firm — Braden Katterheinrich

(57) ABSTRACT

The present invention is a method of maximizing drive performance under any power constraint. In one embodiment, the method includes actively adjusting a seek power draw based on a comparison of real-time calculations of average seek power to a target power threshold.

15 Claims, 7 Drawing Sheets

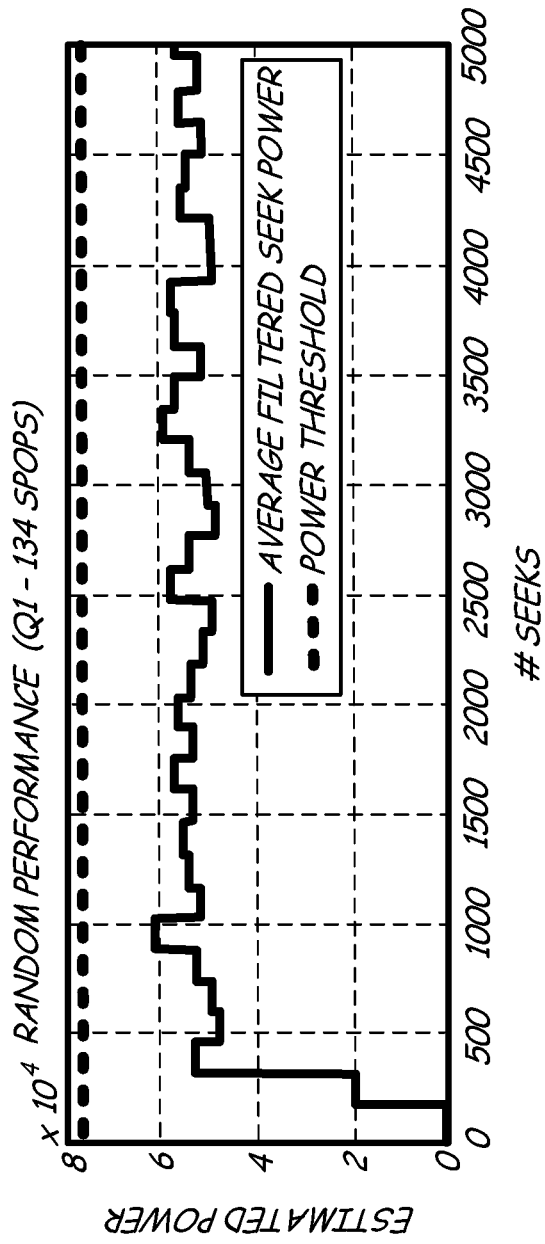
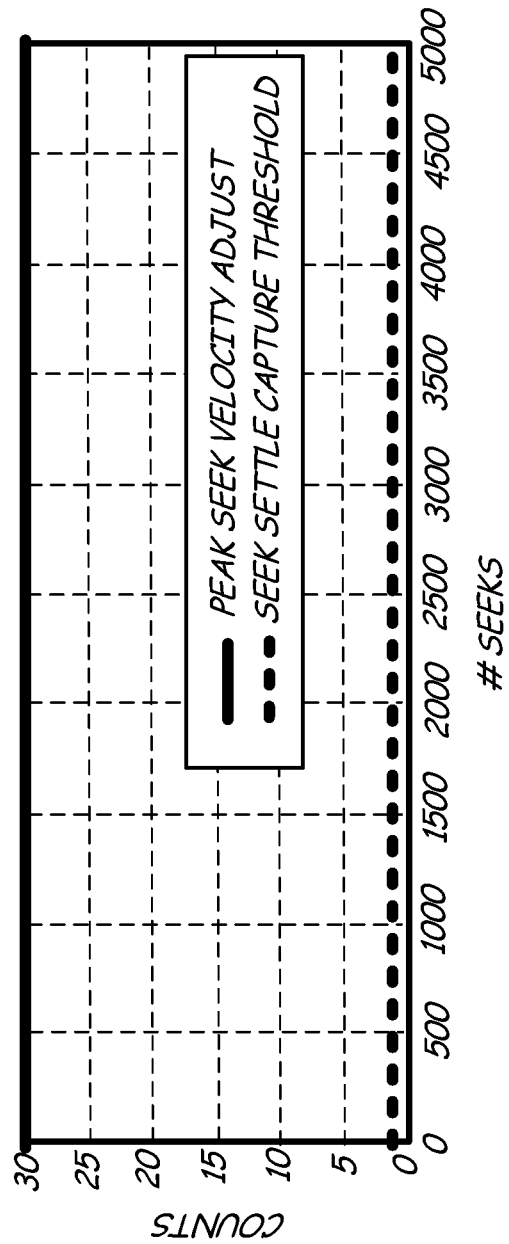
FIG. 7A
FIG. 7B

MAXIMIZING PERFORMANCE UNDER A POWER ENVELOPE CONSTRAINT

FIELD OF THE INVENTION

The present invention relates generally to the field of data storage systems. In particular, the present invention relates to maximizing performance under a power envelope constraint in a data storage system.

BACKGROUND OF THE INVENTION

Power consumption of data storage systems has become an issue of concern. In particular, there has emerged a demand for more stringent power constraints. It is a challenge to satisfy such constraints without having an undesirable negative impact on performance characteristics of data storage operations.

The desire to reduce power consumption is becoming especially significant to the enterprise data storage market place. At the same time, within the disc drive data storage industry, some are transitioning to a smaller form factor (e.g., from a 3.5 to a 2.5 inch form factor). In an ideal scenario, smaller drives will perform, despite more stringent power constraints, close to the larger drives in terms of random input/output performance. Due to factors such as design improvements in terms of areal density growth rate, the smaller drives are sometimes expected to operate at maximum performance with no power margin due to design considerations such as an increased number of discs in the stack (e.g., three discs instead of two), increased arm length for load/unload, increased data rate and increased ASIC processor speed. A 9 W power threshold is preferred by many customers in the enterprise data storage industry. However, some customers have a more relaxed power requirement and would prefer drives to use more power and perform at a higher level. Other customers in power sensitive conditions prefer to use less power but still maintain an optimized level of performance.

Embodiments of the present invention provide solutions to these and other problems, and offer other advantages over the prior art.

SUMMARY OF THE INVENTION

The present invention is a method of maximizing drive performance under any power constraint. In one embodiment, the method includes actively adjusting a seek power draw based on a comparison of real-time calculations of average seek power to a target power threshold. Other features and benefits that characterize embodiments of the present invention will be apparent upon reading the following detailed description and review of the associated drawings.

BRIEF DESCRIPTION OF THE DRAWINGS

FIGS. 7A and 7B are additional graphs demonstrating performance optimization for the power threshold.

DETAILED DESCRIPTION OF ILLUSTRATIVE EMBODIMENTS

Figure 1:
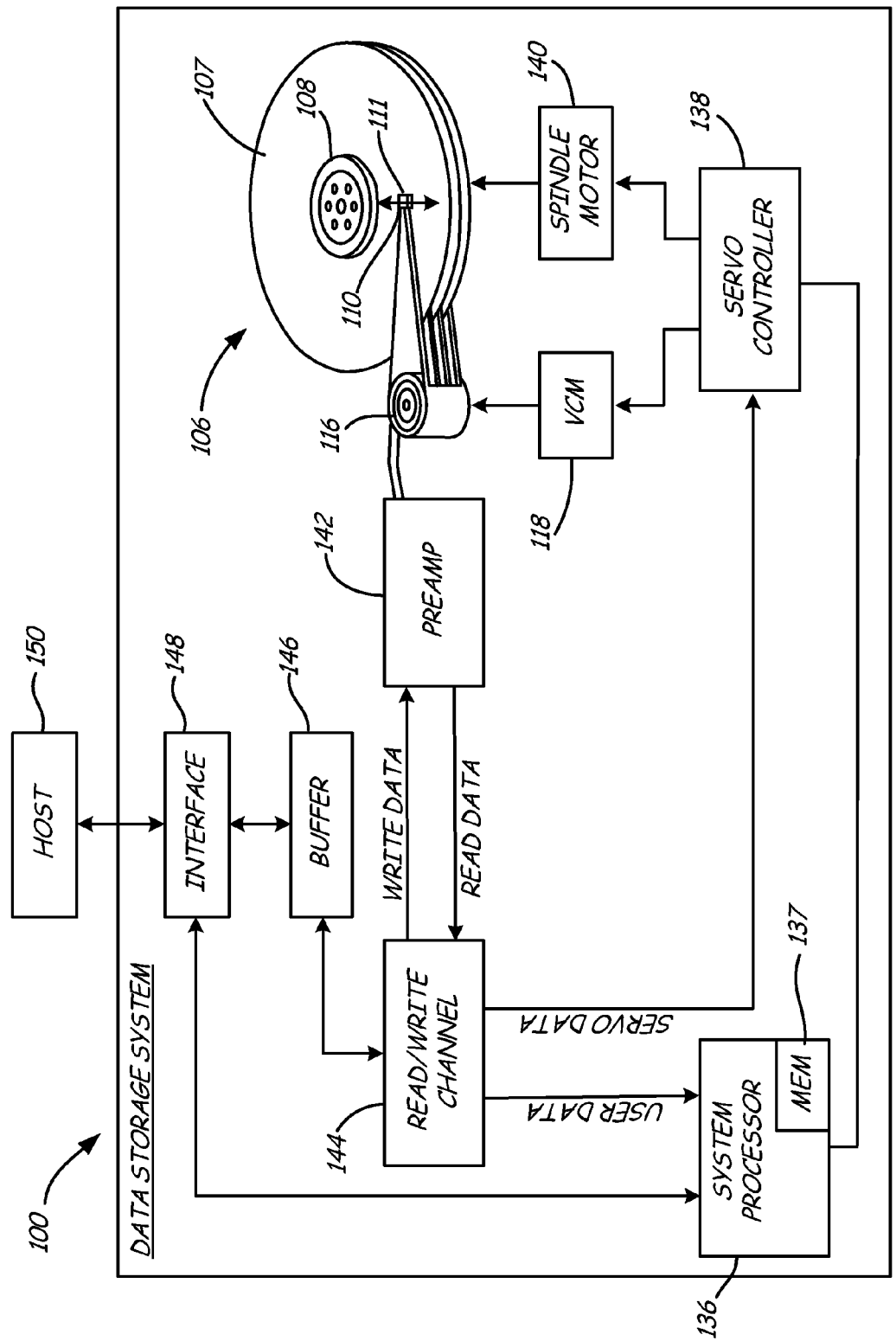
FIG. 1 is a simplified block diagram of a disc drive.

FIG. 1 is a simplified block diagram of a disc drive 100 in accordance with an embodiment of the present invention. Media 106 includes a plurality of discs 107. Each disc 107 has a plurality of substantially concentric circular tracks. Each track is subdivided into a plurality of storage segments. As defined herein, a storage segment is the basic unit of data storage in media 106. Each storage segment is identified and located at various positions on media 106. Storage segments or data sectors are illustratively "pie-shaped" angular sections of a track that are bounded on two sides by radii of the disc and on the other side by the perimeter of the circle that defines track. Each track has related linear block addressing (LBA). LBA includes a cylinder address, head address and sector address. A cylinder identifies a set of specific tracks on the disc surfaces to each disc 107, which lie at equal radii and are generally simultaneously accessible by a collection of heads 111. The head address identifies which head can read the data and therefore identifies which disc from the plurality of discs 107 the data is located. As mentioned above, each track within a cylinder is further divided into sectors for storing data and servo information. The data sector is identified by an associated sector address.

Disc drive 100 includes system processor 136, which is used for controlling certain operations of disc drive 100 in a known manner. In accordance with the present invention, system processor 136 is also used for maximizing drive performance under an applicable power constraint. The various operations of disc drive 100 are controlled by system processor 136 with the use of programming stored in memory 137. Disc drive 100 also includes a servo controller 138 that generates control signals applied to VCM 118 and spindle motor 140. System processor 136 instructs servo controller 138 to seek head 111 to desired tracks. Servo controller 138 is also responsive to servo data, such as servo burst information recorded on disc 107 in embedded servo fields included in the data sectors.

Disc drive 100 further includes preamplifier (preamp) 142 for generating a write signal applied to head 111 during a write operation, and for amplifying a read signal emanating from head 111 during a read operation. A read/write channel 144 receives data from system processor 106 during a write operation, and provides encoded write data to preamplifier 142. During a read operation, read/write channel 146 processes a read signal generated by preamp 142 in order to detect and decode data recorded on disc 107. The decoded data is provided to system processor 136 and ultimately through interface 148 to host computer 150. Disc drive 100, in most cases, will receive operational power from a power supply associated with the host computer 150.

Embodiments of the present invention pertain to methods for maximizing input/output operation performance of a data storage device (e.g., disc drive 100) when subjected to a power constraint. The performance maximization illustratively begins with establishment of a mechanism for acquiring feedback data indicative of drive power during input/output operations. Drive power during input/output is typically the sum of two different power draws, namely a draw for more mechanical functionality (i.e., seek power, motor power, etc.) and a draw for more digital functionality (i.e., loads on SOC, DRAM, etc.). For the purpose of illustration, and not by limitation, the mechanical power draws will be referred to as the 12V power draw and the digital power draw will be referred to as the 5V power draw. Devices with draws at levels other than 12V and 5V are, of course, certainly within the scope of the present invention. Thus, total drive power during input/output operations is illustratively defined as:

Total Power=Power$_{12V}$+Power$_{5V}$
Power$_{12V}$=Seek Power+Motor Power
Power$_{5V}$=Digital Loads on SOC, DRAM Though a portion of both the 12V and 5V power draws is substantially non-variable, it is common for there to be significant drive-to-drive variability in the power drawn during input/output operations. The sources of variations on the 5V side can include processor speed variations. On the 12V side, the sources of power variation can include differences in spindle motor vendors, temperature and seek performance. In one aspect of the present invention, performance of the data storage device is optimized to a power threshold by regulating the seek power contribution to the total power. Real time measurement of seek voltage and current are illustratively combined with FOF (factory of the future) calibration routines to control the total power while maximizing performance. In one embodiment, power is controlled via duty cycle regulation using the tracking latency during random input/output operations. The performance of the data storage device is essentially maximized to the available power.

In one embodiment, average seek power is computed, with real-time measurements of voltage V and current I as:

$$\text{Average Seek Power} = \frac{\int_{t1}^{t2} V * I dt}{\int_{t1}^{t2} dt}$$

Figure 2:
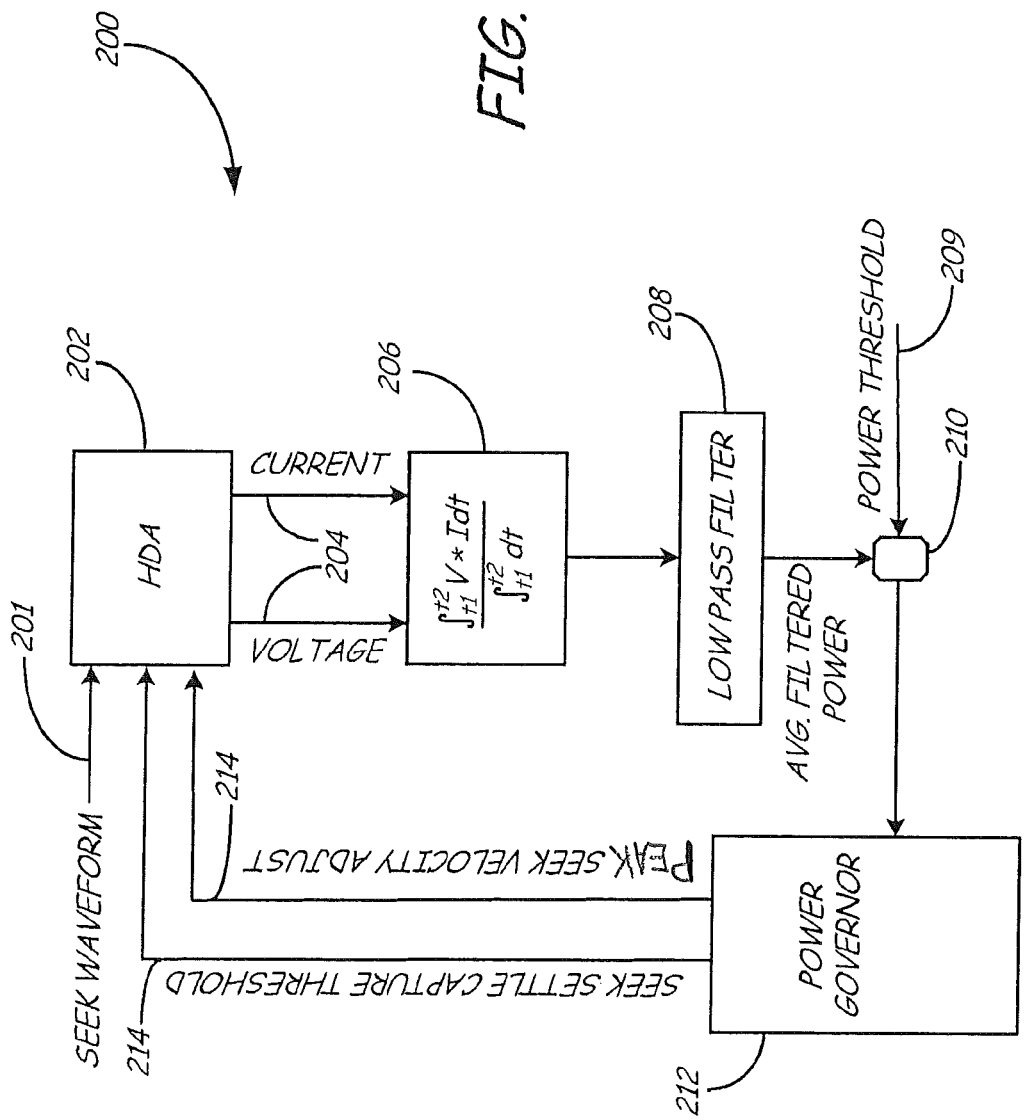
FIG. 2 is a schematic block diagram of a power governor system implemented within a data storage device.

FIG. 2 is a schematic diagram of a power governor system 200 implemented within a data storage device, such as but not limited to disc drive 100 shown in and described relative to FIG. 1. System 200 is illustratively configured for implementation of the power control approach described above. Box 202 represents the head disc assembly (HDA), which generally, but not by limitation, includes the mechanical portions of the disc drive. The HDA typically will include the discs, heads, spindle motor, and actuator similar to the configuration described above in relation to FIG. 1.

As is indicated by arrow 201, a seek waveform 201 is provided to HDA 202. As is indicated by arrows 204, real-time measurements of the seek current and voltage are obtained and utilized to calculate, in accordance with box 206, an average seek power. Optionally, a low pass filter is applied to the average seek power so as to determine an average filtered power. As is generally indicated by box 210, the average filtered power and a power threshold are utilized as a basis for action taken by a power governor 212. In particular, power governor 212 is configured to facilitate power control such that the real-time measurements of the seek current and voltage are utilized to control the seek power (i.e., the 12V seek power) to a target power threshold generally indicated by arrow 209. In one embodiment, the target power threshold is set so as to account for the relatively fixed motor power contributions (i.e., part of the 12V power contributions) and the digital power contributions (i.e., the 5V digital power contributions). In one embodiment, as is indicated by arrows 214, power governor 212 is configured to regulate power while maximizing performance and does so by making seek power adjustments through the control of the tracking latency using seek settle capture and peak velocity parameters. The head disc assembly 202 responds is configured to manage its operation so as to effectuate functionality consistent with parameters 214.

Figure 3:
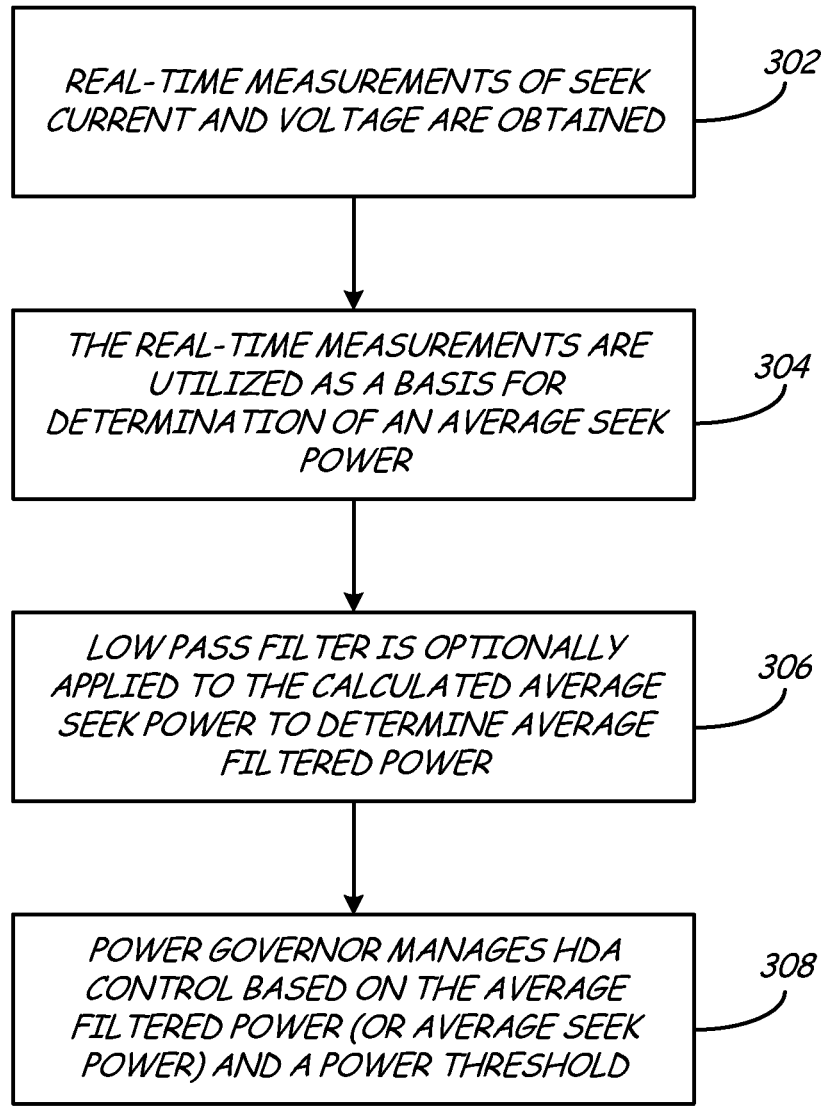
FIG. 3 is a block flow diagram demonstrating a series of steps carried out in the context of the power governor system of FIG. 2.

FIG. 3 is a block flow diagram demonstrating a series of steps carried out in the context of power governor system 200. As is indicated by block 302, real-time measurements of the seek current and voltage are obtained (e.g., measurement relative to a seek waveform input). In accordance with block 304, those real-time measurements are utilized to determine an average seek power. Optionally, in accordance with block 306, a low pass filter is applied to the calculated average seek power so as to determine an average filtered power. As is indicated by box 308, the average filtered power (or the average seek power is no filter was applied) and a power threshold are utilized as a basis for action taken by a power governor (e.g., power governor 212). In particular, the power governor facilitates power control such that the real-time measurements of the seek current and voltage are directly or indirectly utilized to optimize seek power relative to a power threshold. This power management function is illustratively carried out so as to, in the big picture, regulate power while maximizing performance. As was described in relation to FIG. 2, in one embodiment, the management is accomplished by making seek power adjustments through the control of the tracking latency using seek settle capture and peak velocity parameters.

In one embodiment, the power threshold (i.e., threshold 209 in FIG. 2) is selected so as to account for available knowledge in terms of power draws other than seek power such as, but not necessarily limited to, fixed power draws. For example, the threshold illustratively accounts for the motor power draw and/or the digital power draw (e.g., the draw of the motor power portion of the 12V draw and/or the power draw attributed to the 5V power draw sources). Information concerning various power draws may be gleaned from a variety of sources including but not limited to information gleaned from a factory calibration process.

Figure 4B:
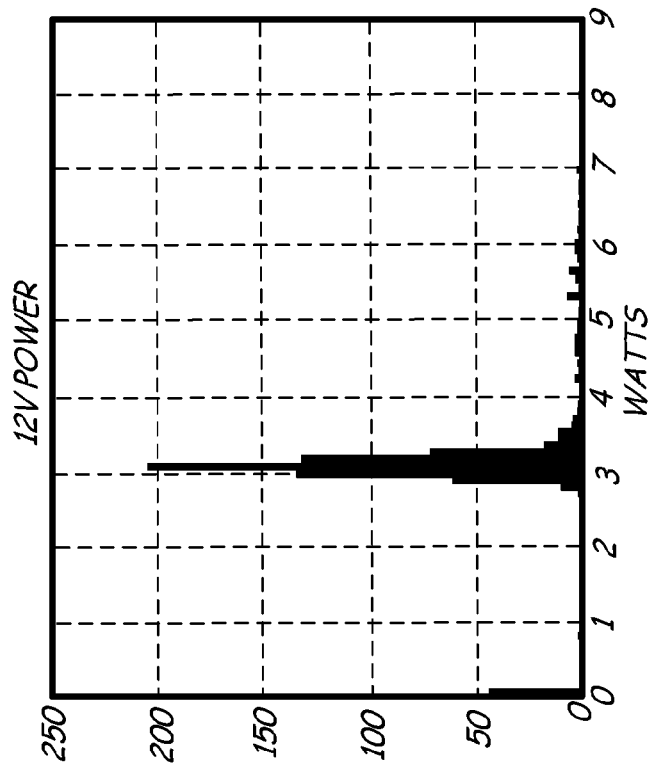
FIGS. 4A and 4B are graphs demonstrating variations in power draws.
Figure 4A:
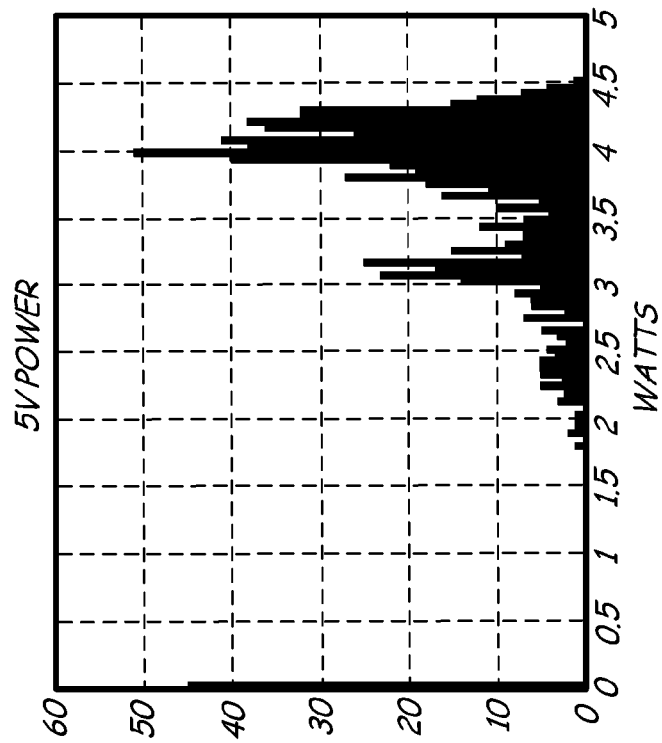

In order to maximize performance of the data storage device, the power threshold should be set to minimize conservativeness, which requires that the accounting of power draws, for example the 12V motor and 5V power draws, be as accurate as possible. In one embodiment, factory calibration routines are applied so as to measure power during random input/output operations in order to set a desirable threshold for the power governor (i.e., power governor 212 shown in FIG. 2). FIGS. 4A and 4B are graphs demonstrating typical variations in 5V and 12 V power draws measured, for example, during a factory calibration process. In one embodiment, the power threshold for the power governor is set so as to account for power draw variability relative to one or more sources of device power draw.

Figure 5A:
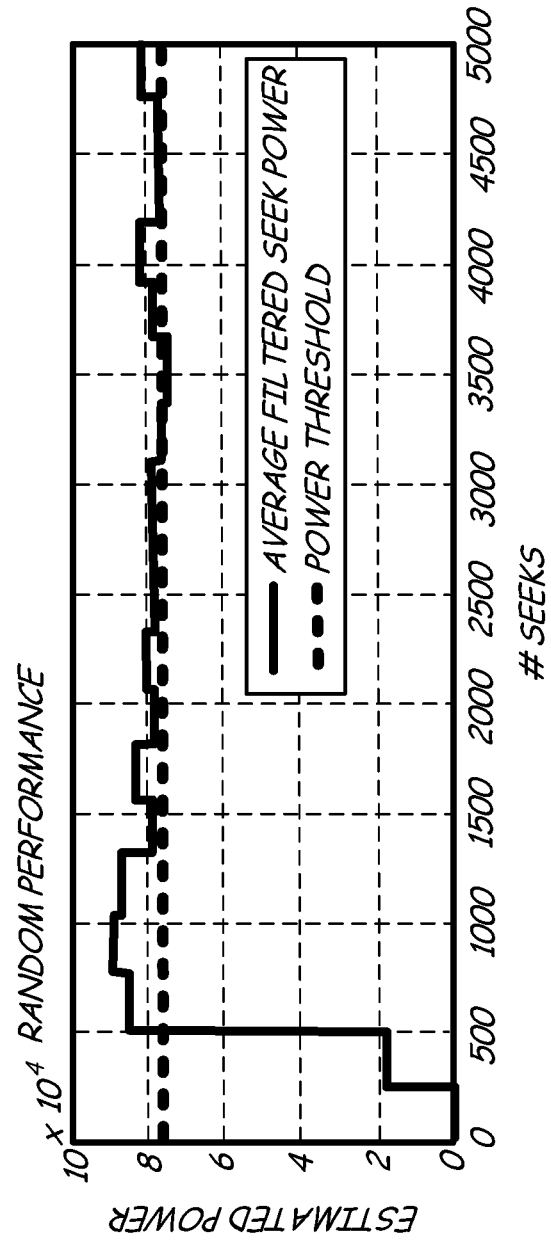
FIGS. 5A and 5B are graphs demonstrating utilization of measured power to control to a power threshold.
Figure 5B:
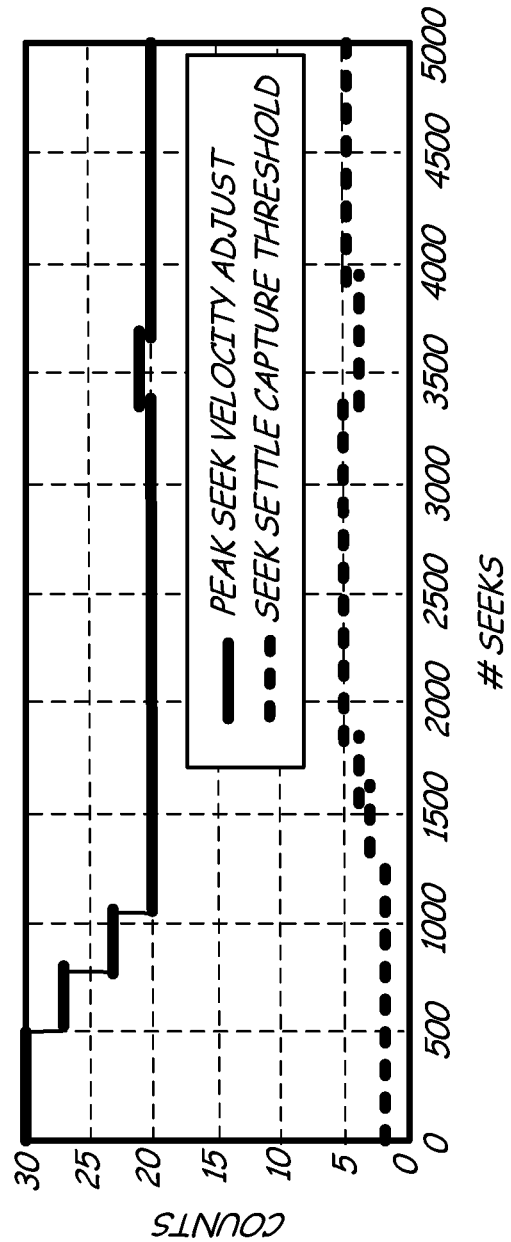
Figure 6:
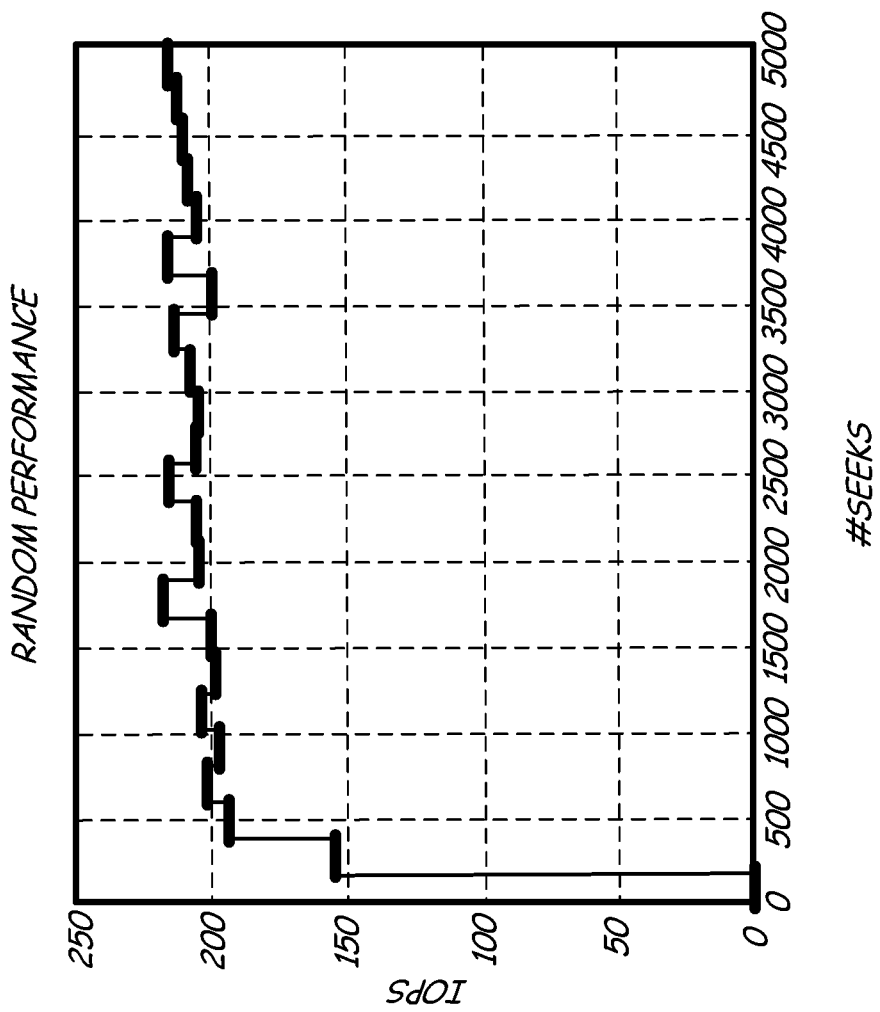
FIG. 6 is a graph demonstrating performance optimization for the power threshold.

An example will now be provided in order to demonstrate operation and the functional impact of the power governor (i.e., power governor 212 in FIG. 2). The example will assume that peak velocity adjust and seek settle capture threshold parameters are used to control the seek power (e.g., the seek power portion of the 12V power) to a desired threshold. With this assumption in mind, FIGS. 5A and 5B are graphs demonstrating utilization of the measured power to control to a threshold such as a threshold selected so as to account for factory information regarding relatively fixed power draws (e.g., the 12V motor draw and/or the 5V digital power draw). FIG. 6 is a graph demonstrating the corresponding performance optimization for the power threshold. FIGS. 7A and 7B are graphs demonstrating a case where the power governor is not active, for example, due to the circumstances wherein the average seek power is below the power threshold. Notably, the performance is still optimized in these circumstances.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application of the method while maintaining substantially the same functionality without departing from the scope and spirit of the present invention. In addition, although the preferred embodiment described herein is directed to a storage system for recovering data, it will be appreciated by those skilled in the art that the teachings of the present invention can be applied to other systems without departing from the scope and spirit of the present invention.

What is claimed is:

1. An apparatus comprising:
a power governor that actively adjusts seek power in response to a calculated average seek power of a series of multiple real-time measurements of seek power so as to bring a power draw of a data storage device into closer conformance with a target power threshold selected to account for power draws of the data storage device other than seek power.

2. The apparatus of claim 1, wherein the power governor adjusts the seek power by adjusting a peak seek velocity parameter.

3. The apparatus of claim 1, wherein the target power threshold accounts for a factory power measurement.

4. The apparatus of claim 1, wherein the target power threshold accounts for a spindle motor power draw.

5. The apparatus of claim 1, wherein the target power threshold accounts for a digital load power draw.

6. The apparatus of claim 1, wherein the target power threshold is set to maximize input/output operation performance.

7. The apparatus of claim 1, further comprising:
a low-pass filter applied to the calculated average seek power.

8. A method comprising:
establishing a target power threshold that accounts for power draws of a data storage device other than seek power; and
adjusting a seek power draw in response to a comparison of a calculated average seek power to the established target power threshold.

9. The method of claim 8, wherein the calculated average seek power is determined in response to a plurality of real-time voltage measurements.

10. The method of claim 8, wherein the target power threshold is set so as to account for at least one fixed power draw.

11. The method of claim 8, wherein adjusting the seek power draw comprises adjusting a peak seek velocity parameter.

12. The method of claim 8, further comprising:
filtering the calculated average seek power with a low-pass filter.

13. The method of claim 8, wherein the calculated average seek power is determined in response to a plurality of real-time current measurements.

14. The method of claim 8, wherein the target power threshold is determined in response to measuring power during random input/output operations.

15. A method for activating a power governor that adjusts seek power in response to real-time measurements of seek power, the method comprising:
establishing a target power threshold that accounts for power draws of a data storage device other than seek power;
calculating an average seek power; and
activating the power governor to adjust seek power if the calculated average seek power is higher than the established target power threshold.

* * * * *